United States Patent [19]
Sheridon

[11] 4,182,553
[45] Jan. 8, 1980

[54] HONEYCOMB DISPLAY DEVICES

[75] Inventor: Nicholas K. Sheridon, Saratoga, Calif.

[73] Assignee: Xerox Corporation, Stamford, Conn.

[21] Appl. No.: 870,700

[22] Filed: Jan. 19, 1978

[51] Int. Cl.² .............................................. G02F 1/13
[52] U.S. Cl. ................................. 350/336; 350/330;
    350/360; 350/149; 350/150; 313/146; 313/217
[58] Field of Search ............... 350/330, 336, 149, 150,
    350/267, 360, 359; 315/169.4; 313/117, 146,
    217, 465, 505

[56] References Cited

U.S. PATENT DOCUMENTS

| 3,238,296 | 3/1966 | Nelson et al. ............... 350/360 X |
| 3,698,793 | 10/1972 | Tellerman ..................... 350/359 |
| 4,001,635 | 1/1977 | d'Auria et al. ............... 350/360 X |
| 4,035,061 | 7/1977 | Sheridon ........................ 350/360 |

Primary Examiner—Edward S. Bauer
Attorney, Agent, or Firm—Irving Keschner

[57] ABSTRACT

An optical display comprised of an array of small movable or deformable elements positioned adjacent a flat plane. Upon the application of a force field to selected ones of the deformable elements, the selected elements change their distance with respect to the flat plane. In the various embodiments disclosed, the change in physical distance is utilized to either modulate incident ambient light or generate light to provide a display having light and dark areas.

9 Claims, 5 Drawing Figures

AMBIENT LIGHT

AMBIENT LIGHT

AMBIENT LIGHT

AMBIENT LIGHT

HONEYCOMB DISPLAY DEVICES

BACKGROUND OF THE INVENTION

In the early development of data display systems, it was customary to employ a cathode ray tube wherein a layer of phosphor material was made to luminesce by means of an electron beam that scanned across the layer of phosphor material. Although good quality images can be created in this manner, the physical size of the images that can be created by a cathode ray tube is severely limited by various factors, such as, for example, power required and distortion of the electron beam path. In order to provide images of greater size, numerous schemes have been proposed for optically enalrging an image created by cathode ray tube. Although an image of greater proportions can be obtained in this manner, the amount of light available from the phosphors present on the face of the tube is very limited. As a result, the quality of the enlarged image and particularly the brightness thereof has heretofore been very poor.

Cathode ray tubes have also been utilized in systems which employ a projection system having a light source which is independent of the cathode ray tube light emission. For example, in U.S. Pat. Nos. 3,667,830; 3,701,586; 3,609,222; and 3,746,785, large scale displays are provided by utilizing a display structure having a deformable, light reflective metallic film supported by a support grid which is situated within a cathode ray tube. When an electron beam scans across the display structure, charge accumulates on areas of the display structure in accordance with the information content of the electron beam. This charge accumulation causes small deformations or dimples to form in the metal film at the areas of the charge accumulation. When light from a projection system is directed upon the metal film, only light which strikes the deformed areas reaches a display screen. Thus, a light image is formed on the display screen corresponding to the dimpled image formed in the metal film by the electron beam. A flood gun must be provided within the cathode ray tube to neutralize the charged areas to thereby allow the deformations in the metal film to relax to the non-deformed or normal position.

The size limitations of display systems using cathode ray tubes has led to the use of matrix addressed displays when large displays are required. In a matrix display, pairs of conductors in a two-dimensional array of such conductors are utilized to address each elemental area of the display to thereby initiate the emission of light at a selected elemental area when the pair of conductors associated with that selected elemental area are properly biased. In such a display system, as described in U.S. Pat. No. 3,091,876, when a selected elemental area is properly biased, a pressure valve is opened which forces a portion of a flexible membrane out past the end of a tubular support member. In this outer position, the reflective surface of the membrane refelcts incident light to provide a visible "bright spot" in the surface of the display to thereby provide a visible display. U.S. Pat. No. 3,091,876 also teaches using an electroluminescent panel in conjunction with the flexible membrane whereby when an elemental portion of the membrane is addressed, the membrane is forced by a pressure system into contact with an electrode of the electroluminescent panel whereby a voltage is applied across an elemental area of the electroluminescent panel to thereby cause it to emit visible light.

As noted, the display systems described which utilize cathode ray tubes suffer from size limitations and the expensive cathode ray tube component. Also, these systems do not use ambient light as the projection light source. The matrix display systems that utilize a pressure source also suffer from the requirement of expensive mechanical components and also, especially when using an electroluminescent panel, from the lack of a threshold behavior since the elemental areas adjacent a selected elemental area receive half the voltage applied across the selected elemental area and that voltage may be sufficient to initiate undesirable glow discharges and hence undesirable light output at areas adjacent the selected elemental area. Also, many of the display systems described do not have machine readable capabilities.

A display device which is an improvement on the above mentioned prior art devices and which provides a flat optical display device that uses ambient light, is addressed by existing electronics, has a threshold behavior and is machine readable is disclosed in U.S. Pat. No. 4,035,061, issued July 12, 1977 and assigned to the assignee of the present invention.

In particular, an array of focusable image elements in conjunction with a corresponding array of optical stops or filters, one optical stop or filter for each image element are utilized. Each of the focusable image elements is addressed in a matrix manner whereby a force can be created at selected image elements to change the focal point of the light reflected or transmitted by those selected image elements. The change in the focal point of the selected image elements causes some of the ambient light reflected or transmitted by those image elements to bypass the optical stops associated with those image elements which optical stops would otherwise absorb most, and desirable all, of the light reflected from or transmitted by those elemental areas had the focal point of those focusable image elements not be changed. Thus, the change in the focal point of selected image elements or areas of the display is used to provide a visible display which utilizes ambient light and existing switching technology. In addition, a sharp threshold behavior is exhibited which enables the number of peripheral address elements to be held to a manageable quantity. In one of the disclosed embodiments, the focusable image elements are light reflectors which are provided over a perforated support sheet having a perforation for each image element. The reflectors can be spherical or paraboloidal indentations in a flat sheet, suitably coated for optical reflectivity and electrical conductivity, and stretched over the perforations of the support sheet. The indentations are "popped" between concave and convex curvatures to provide the desired change in focal point required for selected image elements to provide a display.

It would be desirable if the basic display device disclosed in the aforementioned U.S. Pat. No. 4,035,061 could be modified to provide additional video display techniques while retaining the aforementioned advantages thereof.

SUMMARY OF THE PRESENT INVENTION

The present invention provides an array of movable or deformable elements on a surface which may be switched from concave to convex or vice-versal under the action of an electric field, thereby providing optical convergence or divergence, respectively. When these elements pop from one state to another they change their distance with respect to a flat plane adjacent to the poppable surface. In a first embodiment, a glass surface is placed close to the poppable surface and a deformable material placed in the intervening space therebetween. The material is squeezed by the motion of the elements of the poppable surface when they are switched from concave to convex. In the case where the material is liquid, a contrast may be provided between those areas where the liquid is squeezed out between the poppable surface and the glass surface so that where the poppable element is in the convex configuration the liquid has been squeezed out and to the observer this area will appear as the color of the liquid or deformable substance residing under the poppable element, whereas in the concave configuration the area will appear to be the color of the surface of the element. Selectively applying a field across this device results in the desired display.

In an alternate embodiment, a conductive glass surface is placed adjacent to the poppable surface and an electric field is applied between the two surfaces, an electric field sensitive material being interposed therebetween. The electric field in the intervening space will change as the elements of the poppable surface are changed, changing the optical properties of the material. In a further embodiment, a glass surface is placed sufficiently close to the poppable surface such that actual contact will occur in one of the switched positions, the contact causing optical effects which can be utilized in a video display.

It is an object of the present invention to provide an optical display which utilizes the optical effects produced by moving a movable or deformable element from one position to another with respect to an adjacent flat plane.

It is a further object of the present invention to provide an optical display which utilizes the optical effects produced by selectively moving a movable or deformable element formed on a substrate from one position to another with respect to an adjacent flat plane, the variation in distance between the element and the flat plane modulating incident ambient light or generating light to form a desired display.

BRIEF DESCRIPTION OF THE DRAWINGS

For a better understanding of the invention as well as other objects and further features thereof, reference is made to the following description which is to be read in conjunction with the following figures wherein.

DESCRIPTION OF THE PREFERRED EMBODIMENTS

Figure 1:
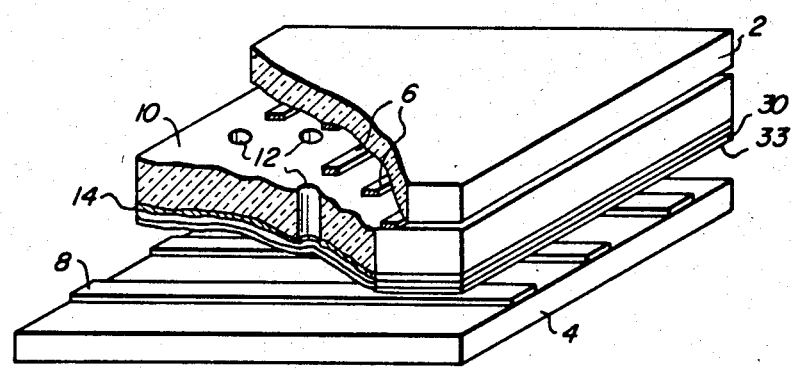
FIG. 1 is a perspective view of one embodiment of a display in accordance with the present invention.

Referring now to FIG. 1, there is shown a perspective view of a display system in accordance with one embodiment of the present invention including displaced electrically insulating substrates 2 and 4 which support electrically conductive matrix switching electrodes 6 and 8, respectively. Electrodes 6 run in one direction and electrodes 8, which preferably are optically transparent, run in a transverse direction, as shown in FIG. 1, to provide a plurality of matrix crossover points to provide for matrix addressing. A perforated electrically insulating sheet or grid 10 is disposed between the substrates 2 and 4 with a perforation 12 aligned with each matrix cross-over point.

Figure 2:
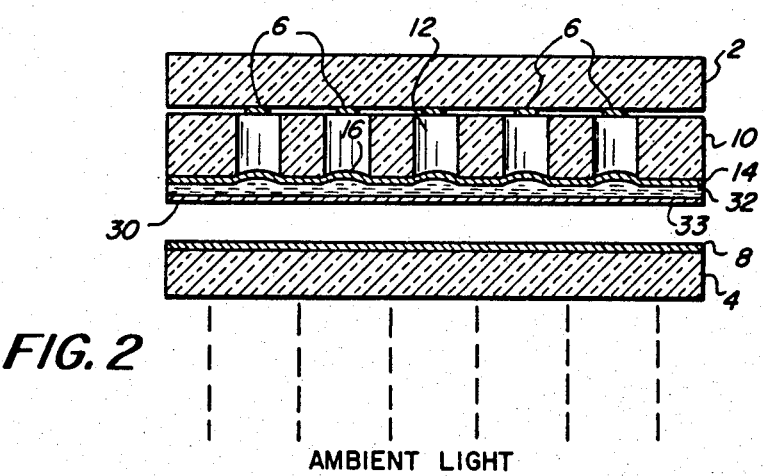
FIG. 2 is a side view of the display of FIG. 1 showing operation of that display.

The insulating sheet 10 supports on one surface thereof a thin electrically conductive surface layer 14 which has a poppable (movable) or deformable portion 16 over each of the perforations 12. Layer 14 can be a layer of metallic material suitably deposited to have good light reflecting properties or can be a laminated elastic structure having a light reflective surface oriented toward substrate 4. In the embodiment illustrated further in FIG. 2, a substrate 30, such as glass, is positioned adjacent poppable surface 14 and a deformable material 32 is enclosed in the intervening space between substrate 30 and poppable surface 14. Typical deformable materials which can be utilized include silicone oil, such as Dow Corning Series 200 oil; hydrocarbon oil such as white mineral oil, refined petroleum oil or caster oil,; and soft transparent elastromers such as silicone elastomers, plasticized dimethyl polysiloxane being an example thereof. The deformable portions 16 of layer 14, which can be, for example, spherical or paraboloidal indentations in the otherwise flat plane of layer 14, can exist in two stable states, that is, concave away from substrate 4 or convex towards substrate 4. For purposes of illustration, the portions 16 are shown in FIG. 2 as concave away from substrate 4.

When properly constructed, all the deformable portions 16 will initially be in either the concave away or convex toward substrate 4 configuration, depending upon the type of display desired as set forth hereinbelow. In the convex state, material 32 will be squeezed by the motion of the elements 16 of the poppable surface 14. The deformable material 32 is first densely dyed or pigmented and is substantially translucent. Typical dyes which may be utilized include the Calco Oil Red A-1700 and Calco Oil Blue N made by the American Cyanamid Corporation. Typical pigments which can be utilized include phthalocyanine, carbon black and titium dioxide. The dyes or pigments are mixed with the liquid deformable material and the elastomer deformable material, the latter prior to curing. The hydrocarbon oil is preferred as the deformable medium since the dyes and pigments are easily dissolvable therein. If the surfaces of the poppable elements are made either reflective (the normal configuration) or painted white, then in the convex switch state of a given element 16 (surface 14 towards glass surface 30) the area occupied by that element will appear to have the color or reflectivity of the surface of the element 16 when exposed to ambient light, and in the concave switch state of the element as illustrated in FIG. 2, the area will appear to have nearly the color of the dyed or pigmented material. The areas of the display corresponding to the non-movable portions of element 16 will also appear to have the color of the dye or pigmented material 32.

If the deformable material is a liquid crystal wherein a mechanical force, such as that when element 16 is popped toward the surface of the glass substrate, creates shear forces in the liquid crystal which in turn causes the optical properties of the liquid crystal to change upon being deformed, imagewise addressing of the poppable surface will therefor also result in a directly viewable image. Liquid crystal materials which can be utilized can be the chlorestic, nemetic or smectic types, typical examples of such liquid crystals being disclosed in U.S. Pat. No. 3,666,947, the teachings of which that are necessary for an understanding of the invention being incorporated herein by reference. If very soft elastomers such as the plasticized dimethyl polysiloxane or other transparent elastomers, are utilized as the deformable material 32 to take advantage of the strain birefringence thereof, an ambient light-readable image would be obtained if a sheet of polarizing material (not shown) would be placed adjacent to the surface 33 of substrate 30. This occurs because deformation of strain birefringent materials, including liquid crystals, changes their optical character such that they polarize transmitted light. The polarized sheet would constitute a partially crossed polarizer with respect to either the deformed or the undeformed portion of layer 32, resulting in either increased or decreased attenuation of the reflected light and hence a viewable image. With deformable portions 16 convex towards substrate 4, the changed optical characteristics of the deformable material 32 allows sufficient optical contrast in response to the ambient light to provide a display. In the convex switch state of a given element, the area occupied by that element will take on the optical characteristics of the changed caused by the deformation (i.e. color and birefrigence if liquid crystal is used) when exposed to ambient light and in the concave switch state of the element the area will appear to have normal optical characteristics of the material. The dimensional relationship between the size of perforations 12 and hence the size of deformable portions 16, and the distance between substrate 8 and glass surface 33, is such that a viewer would be able to ascertain the difference in optical densities at glass surface 33 due to movement of movable portions 16. Substrate 30 is positioned adjacent surface 14, typically 25 microns therefrom.

The layer 14 is sufficiently thin and lacking in thickness so that the application of a high voltage at one of the matrix cross-over points provides sufficient electrostatic attraction to cause the deformable portion 16 associated with that matrix cross-over point to "pop" from a configuration concave away from substrate 4 to convex toward substrate 4. The magnitude of the applied volrage required to "pop" a selected deformable portion 16 is, of course, controlled by the geometry of the portions 16 and their spacing from the electrodes 6 and 8. These voltage requirements will be readily apparent to one skilled in the art. The operation of causing the deformable portion 16 to "pop" from one stable state to the other requires three electrodes. These are the electrodes 6 and 8 and the conducting portion of the layer 14. The fields between these electrodes would be normally so constitutred that there would be an attractive force between the layer 14 and one set of electrodes, toward which the portions 16 are initially "popped." There would be no attractive fields between the conductive deformable layer 14 and the second set of electrodes. The electrical field normally maintained between the layer 14 and the first set of electrodes would be less than that required to "pop" the elements 16 from one state to another. To cause an element 16 to "pop" to its opposite state, the voltage between it and the corresponding row of first electrodes would be substantially reduced or removed. At the same time, the electrical field between it and the corresponding column of the second set of electrodes would be increased to a value slightly greater than the threshold field required to "pop" an element into the other state. Only the element 16 at the intersection of the row of first electrodes and the column of second electrodes will experience a greater-than-threshold net field and "pop". To erase, the field with respect to the first electrodes is raised above the threshold level. It should be noted that the conductive deformable layer 14 may be a single conductor or a plurality of conductive strips. The latter configuration allows some simplifications in the address electronics. Also, the individual row or column electrodes of electrode sets 6 and 8 may be comprised of a plurality of two or more electrodes independently accessed, thereby allowing still further simplifications in the address electronics.

Figure 3:
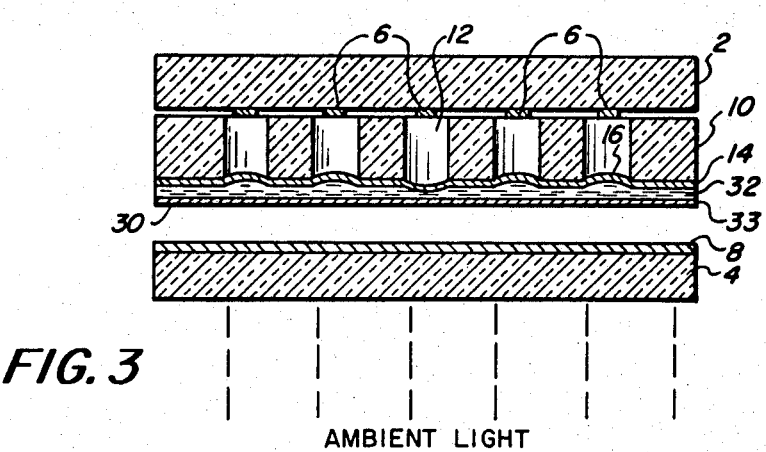
FIG. 3 is a side view of another embodiment of the display of the present invention.

Referring now to FIG. 3, the central matrix cross-over point of the one matrix row shown has been addressed with sufficient voltage applied to electrodes 6 and 8 to "pop" the central deformable portion 16 from concave away from substrate 4 to convex toward substrate 4 causing the display area associated with the central deformable portion 16 to have the color due to the "squeezing" effect of the popped element 16 on material 32. In the case wherein dye or pigmented material is utilized as material 32, the display area will be the color of layer 14.

The perforated electrically insulating sheet 10 can be comprised of an array of parallel glass capillary tubes fused toegether in a uniform and mechanically rigid matrix. The tubes can have a circular or square cross seciton, although other shapes will also produce satisfactory results. In lieu of fused tubes, sheet 10 can be a glass or plastic sheet which, after being metallized on one surface to provide layer 14, is etched through from the other surface using standard photolithographic techniques and selective etchants to provide the perforations 12. Alternatively, the metal layer 14 can be applied after the glass or plastic sheet is etched.

Any suitable light reflecting material is preferred to be utilized for layer 14. Desirably, the material of layer 14 will be capable of many flexings or "poppings" without fatigue. While any suitable layer thickness can be used for layer 14, good results will be obtained in the case of a solid metal layer with a layer thickness between one tenth and ten microns. Substantially thinner layers lack mechanical strength, while substantially thicker layers do not have the desired flexure characteristics at reasonable potentials. Typical materials for layer 14 include silver, aluminum, copper, nickel and gold/indium alloys. These materials, and especially gold/indium alloys, can be deposited in such a manner that they tend to expand their surface area upon deposition and hence will provide deformable portions concave away from their support surface as shown in FIG. 2. The layer 14 may also be formed from a metallized elastomer membrane. Upon the perforated support 10 is laid a thin sheet of elastomer material, such as a plasticized dimethyl polysiloxane. This sheet would be one of twentyfive microns thick, and preferably 3 microns thick, and it will tend to adhere to the solid portions of the surface of perforated sheet 10. The surface of the layer 14 would next be metallized with a metal or metal alloy, mentioned above, which tends to expand its surface area upon application creating the deformable spheroidal sections on unsupported areas of layer 14. Alternatively, the elastomer layer might be plasticized by, for example, immersion in a suitable liquid, after application to the perforated support 10. This will cause the elastomer to swell, generally resulting mainly in a thickness change where supported and an area and thickness change adjacent to the perforations 12, creating the desired spheroidal indentations. This structure would be subsequently metallized, for example, by vacuum evaporation, to obtain electrical conductivity and optical reflectivity.

Figure 4:
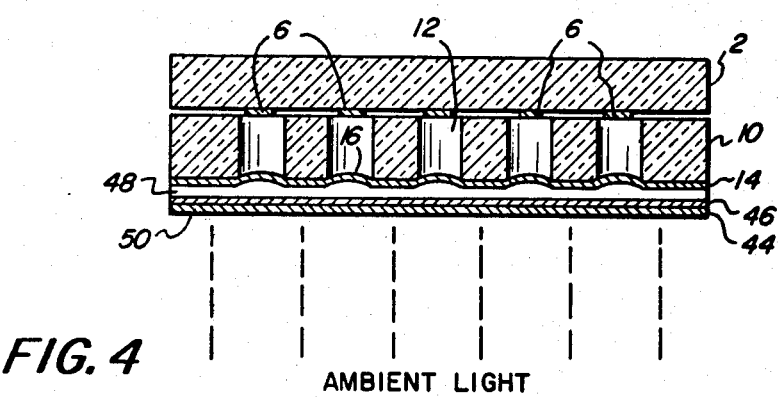
FIG. 4 is a side view of another embodiment of a display in accordance with the present invention.

The display described in relation to FIGS. 1, 2 and 3 operates in a light reflection mode with light being reflected from deformable portions 16 or the material 32 enclosed therein. In FIG. 4, wherein parts corresponding to the like parts of the display of FIGS. 1-3 have the same reference numerals, an embodiment of the invention is illustrated which operates in a light reflection mode but with the optical effects caused by an electrical field. A substrate 44, such as glass, having a transparent conductive layer 46, such as tin oxide, formed thereon, is placed adjacent to the poppable surface 14 and an electric field is placed therebetween via a voltage source (not shown) connected between surface 14 and layer 46.

It should be noted that in this embodiment substrate 4 and electrode 8 are not required, since layer 46 will be formed in an electroded pattern corresponding to that of electrode 8 and will therefor provide for selective addressing of the poppable elements while simultaneously creating the aforementioned optical effects. The electric field in the intervening space will change as the elements of the poppable surface are popped in and out. If a liquid crystal material 48 is placed in the enclosed intervening space between surface 14 and layer 46, it will undergo a change in optical properties as the field is increased due to a change in the poppable surface, i.e., with an element 16 popping towards substrate 44 such as to reduce the intervening space therebetween, the electric field increases in that area and effects the optical properties of the liquid crystal material. It should be noted that the force of the poppable member 16 on the liquid crystal also effects its optical characteristics, the electric field enhancing the optical contrast effects. This effect will disappear with element 16 popped in the reverse direction. The liquid crystal material need not fill the intervening space, but could be, for example, simply coated on the conductive glass surface 46. In this situation, only the increase in the electrical field in the area of the poppable element 16 effects the optical properties of the liquid crystal material.

If a low pressure inert gas, such as neon, helium, or argon, at pressures in the range from 1 to 100 mm of mercury, is placed in the intervening space between the poppable surface and the conductive glass surface when an element 16 is popped toward the glass substrate 46, the local electrical field will increase, causing the gas to ionize and thereby initiating a light emitting glow discharge limited to the area of that element. This glow will be extinguished when the element is popped in the opposite direction away from glass substrate 44. In this mode of operation ambient light is not required since the glow will generate the required display light.

Electro-optic materials, such as potassium dihydrogen phosphide, lithium niobate and liquid crystals, when placed in the intervening space, or placed directly on the conductive glass surface 46, will undergo a change in birefrigence when exposed to the electric field changes associated with the motion of the elements 16 of the poppable surface adjacent thereto. With these a directly viewable image will be visible through substrate 44 by placing a polarizing sheet directly on the opposite surface 50 of glass substrate 44 and exposing the material to ambient light as shown.

Figure 5:
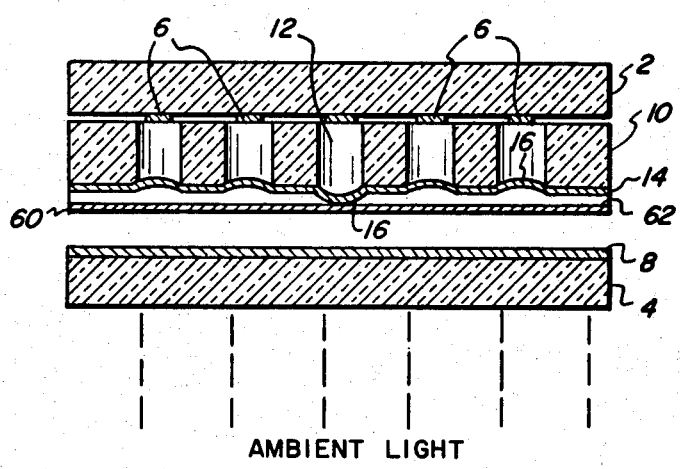
FIG. 5 is still a side view of another embodiment of a display in accordance with the present invention.

FIG. 5 shows a further embodiment of the present invention. In particular, glass surface 60 is placed at a distance from poppable surface 14 such that deformable elements 16, when popped toward glass surface 60, actually contact the surface 62. The figure shows a selected element in contact with the glass surface 60. If one of the surfaces, such as the surface of the elements 16, are roughened by vacuum deposition of a material that tends to form isolated crystals, such as indium, so as to be light scattering and the other surface (glass surface 62) is made mechanically soft and light absorbing by depositing a thin dyed elastomer thereon, contact between the two surfaces will produce a light absorbing condition when exposed to ambient light, whereas the absence of contact will produce a light scattering (diffuse reflection) condition, the former appearing as a dark area when viewed through substrate 4, the latter appearing as a light area when similarly viewed. The opposite situation results if the surface of elements 16 is made mechanically soft and light absorbing and the surface of substrate 62 is made light scattering.

If the conductive surface is formed on the glass substrate 60, the surface not being modified to being light scattering or light absorbing, the contact of the poppable elements 16 with the conductive surface can be used as a high current switch (a direct current path from the voltage thereby being provided) to effect the optical properties of materials interposed between the two surfaces by current generated heat. For example, heating a wax, such as paraffin, past its sharply defined melting point changes its optical properties from scattering, or reflecting, to non-scattering, or absorbing. Further, the non-light scattering characteristics of liquid crystals (such as the nematic type) will be changed to dynamic scattering with the passage of current therethrough.

It should be noted that the teachings of the aforementioned U.S. Patent 4,035,061 necessary for the understanding of the present invention are incorporated herein by reference.

The display system shown in the figures utilizes only ambient light (except for one of the embodiments utilizing the FIG. 4 structure wherein an inert gas is utilized to generate light), is flat and is theoretically unlimited in size, and requires no external optics for viewing. In addition, the display is easily addressable by standard matrix switching techniques, and is machine readable since the change in shape of portions 16 will change the capacitance between portions 16 and the electrodes 6 and 8, (6 and 46 in the FIG. 4 embodiment) with the change in capacitance being monitored by conventional apparatus to provide the desired machine readability.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An optical display comprising:
an array of movable elements, a transparent substrate positioned adjacent said array of movable elements, each movable element occupying an area which corresponds to an area of said display, a deformable material interposed between said transparent substrate and said array, and means for causing selected ones of said movable elements to move towards said substrate, said selected movable elements interacting with the deformable material in an area corresponding to said selected movable element whereby the optical characteristics of the deformable material which has interacted with said movable elements differs from the optical characteristics of the deformable material in the areas corresponding to the non-selected movable elements, the area of the display corresponding to the area occupied by said selected elements differing in contrast from the area of the display corresponding to the area occupied by the non-selected elements when said display is exposed to ambient light through said transparent substrate.

2. The optical display as defined in claim 1 wherein said deformable material comprises a colored, translucent material, the area of the display corresponding to the area occupied by said selected elements being the color of said deformable material, the area of the display corresponding to the area occupied by the non-selected elements having a color determined by the surface reflectivity of said non-selected elements.

3. The optical display as defined in claim 1 wherein said deformable material comprises a liquid crystal the optical characteristic of which is different in the area occupied by the selected movable elements than in the area occupied by the non-selected movable elements.

4. The optical display as defined in claim 1 wherein said deformable material is of the type such that the polarization of light transmitted therethrough is different in the area occupied by the selected movable elements than in the area occupied by the non-selected movable elements.

5. An optical display comprising:
an array of conductive movable elements, a transparent conductive substrate positioned adjacent said array of movable elements, each movable element occupying an area which corresponds to an area of said display, a material sensitive to an electric field interposed between said substrate and said array, and means for applying an electric field between said conductive movable elements and said substrate and causing said selected movable elements to move towards said transparent conductive substrate causing the electric field in the area corresponding to said selected movable element to increase, the optical characteristics of the sensitive material in the area of said increased electric field differing from the optical characteristics of the material in the area corresponding to the non-selected movable elements, the area of the display corresponding to the area occupied by the non-selected elements differing in contrast from the area of the display corresponding to the area occupied by the non-selected elements.

6. The optical display as defined in claim 5 wherein said material is liquid crystal and said display is exposed to ambient light through said substrate to provide said difference in contrast.

7. The optical display as defined in claim 5 wherein said material is a low pressure inert gas, a light emitting glow being initiated in the area of said selected movable elements due to the ionization of said gas in said area.

8. The optical display as defined in claim 5 wherein the birefringence of said material in the area of said selected movable element differs from the birefringence of said material in the area of the non-selected movable elements, said display being exposed to ambient light through said substrate to provide said difference in contrast.

9. The optical display as defined in claim 5 wherein said selected movable elements contact the conductive surface of said substrate, the material between said selected elements and said conductive surface changing optical characteristic due to heat caused by current passing therethrough.

* * * * *